US012415166B2

(12) United States Patent
Shi et al.

(10) Patent No.: US 12,415,166 B2
(45) Date of Patent: Sep. 16, 2025

(54) IMPELLER ASSEMBLY AND SOLID-LIQUID MIXING DEVICE USING SAME

(71) Applicant: Shangshui Smartech Ltd., Shenzhen (CN)

(72) Inventors: Qiao Shi, Shenzhen (CN); Shujuan Bai, Shenzhen (CN); Quanxun Ou, Shenzhen (CN)

(73) Assignee: SHANGSHUI SMARTECH LTD., Guangdong (CN)

( * ) Notice: Subject to any disclaimer, the term of this patent is extended or adjusted under 35 U.S.C. 154(b) by 33 days.

(21) Appl. No.: 17/631,377

(22) PCT Filed: Jul. 1, 2020

(86) PCT No.: PCT/CN2020/099635
§ 371 (c)(1),
(2) Date: Nov. 22, 2024

(87) PCT Pub. No.: WO2021/017740
PCT Pub. Date: Feb. 4, 2021

(65) Prior Publication Data
US 2025/0161894 A1 May 22, 2025

(30) Foreign Application Priority Data
Jul. 31, 2019 (CN) .......................... 201910711339.5

(51) Int. Cl.
*B01F 27/00* (2022.01)
*B01F 27/111* (2022.01)
(Continued)

(52) U.S. Cl.
CPC ........... *B01F 27/111* (2022.01); *B01F 27/117* (2022.01); *B01F 27/811* (2022.01); *B01F 35/71775* (2022.01); *B01F 23/53* (2022.01)

(58) Field of Classification Search
CPC ..... B01F 27/111; B01F 27/117; B01F 27/811; B01F 35/71775; B01F 23/53
See application file for complete search history.

(56) References Cited

U.S. PATENT DOCUMENTS

| 10,195,573 | B2 | 2/2019 | Hoefken |
| 2006/0268657 | A1 | 11/2006 | Schertenleib |
| 2013/0226521 | A1 | 8/2013 | Kamiya et al. |

FOREIGN PATENT DOCUMENTS

| CN | 1571691 A | 1/2005 |
| CN | 101239286 A | 8/2008 |

(Continued)

OTHER PUBLICATIONS

Machine Translation of CN108465388A to Xudong (Year: 2018).*

(Continued)

*Primary Examiner* — Anshu Bhatia
(74) *Attorney, Agent, or Firm* — Young Basile Hanlon & MacFarlane, P.C.

(57) ABSTRACT

An impeller assembly for a solid-liquid mixing device, and a solid-liquid mixing device using the impeller assembly. The impeller assembly comprises an impeller. The impeller comprises a truncated conical body. Multiple mixing blades are formed from top to bottom on an inclined surface of the body. The impeller assembly further comprises at least one blocking plate provided on an outer side of a lower portion of the body. The mixing device further comprises: a housing; at least one solid supply apparatus; at least one liquid supply apparatus; a mixing chamber defined by corresponding portions of the body and the housing; and a dispersion chamber provided between a flow channel outlet at a lower portion of the mixing chamber and a discharging apparatus.

8 Claims, 10 Drawing Sheets

(51) Int. Cl.
   *B01F 27/117* (2022.01)
   *B01F 27/81* (2022.01)
   *B01F 35/71* (2022.01)
   *B01F 23/53* (2022.01)

(56) References Cited

FOREIGN PATENT DOCUMENTS

| | | |
|---|---|---|
| CN | 102740960 A | 10/2012 |
| CN | 103842063 A | 6/2014 |
| CN | 105148766 B | 12/2015 |
| CN | 207667471 U | 7/2018 |
| CN | 108465388 A | 8/2018 |
| CN | 108671789 A | 10/2018 |
| CN | 109173815 A | 1/2019 |
| CN | 110394082 A | 11/2019 |
| DE | 1432027 A1 | 11/1968 |
| JP | 2012210621 A | 11/2012 |
| JP | 2017159259 A | 9/2017 |
| JP | 2019063724 A | 4/2019 |
| KR | 101200034 B1 | 11/2012 |
| WO | 9310665 A1 | 6/1993 |
| WO | 2019065988 A1 | 4/2019 |

OTHER PUBLICATIONS

The extended European search report issued in corresponding European application No. 20846120.2 dated Sep. 9, 2022.
Examination report issued in corresponding European application No. 20846120.2 dated May 4, 2023.
Examination report issued in corresponding European application No. 20846120.2 dated Oct. 31, 2023.
The first office action and English Translation issued in corresponding CN application No. 201910711339.5 dated Aug. 4, 2020.
The second office action and English Translation issued in corresponding CN application No. 201910711339.5 dated Nov. 10, 2020.
The first office action and English Translation issued in corresponding KR application No. 10-2022-7002670 dated Aug. 2, 2023.
Notice of allowance and English Translation issued in corresponding KR application No. 10-2022-7002670 dated Feb. 16, 2024.
Notice of Reasons for Refusal and English Translation issued in corresponding JP application No. 2022-503453 dated Dec. 16, 2022.
Notice of allowance and English Translation issued in corresponding JP application No. 2022-503453 dated Apr. 11, 2023.
International Search Report translation for International Application No. PCT/CN2020/099635, Sep. 29, 2020.

* cited by examiner

IMPELLER ASSEMBLY AND SOLID-LIQUID MIXING DEVICE USING SAME

CROSS REFERENCE TO RELATED APPLICATION(S)

This application is a National Stage of International Application No. PCT/CN2020/099635, filed Jul. 1, 2020, which claims priority to Chinese Patent Application No. 201910711339.5, filed on Jul. 31, 2019, the entire disclosures of both of which are hereby incorporated by reference.

TECHNICAL FIELD

The present disclosure relates to the field of impeller assembly for solid-liquid mixing devices, and particularly relates to an impeller assembly for mixing of ultrafine powder and liquid to generate a high-viscosity or high-concentration suspension. The present disclosure also relates to a solid-liquid mixing device using the impeller assembly.

BACKGROUND ART

In the industrial field, many liquid raw materials are prepared by mixing powder and liquid, and particularly, ultrafine powder such as nanoscale powder is mixed and dispersed in a small amount of liquid or mixed and dispersed into high-viscosity liquid such as slurry applied to the field of positive and negative electrodes of lithium ion batteries. Generally, the whole mixing process can be divided into three stages such as scattering, wetting and dispersing. In the scattering stage, the powder is changed into a smoke state from large agglomerates through stirring of structures such as blades and the like. In the wetting stage, powder is in contact with liquid, but with the development of powder technology and nanotechnology, the specific surface area of the powder is obviously increased, the surface of the powder can adsorb a large amount of gas, and in the process that ultrafine powder is dispersed into a small amount of liquid to form high-viscosity slurry, sufficient infiltration of powder particles and the liquid is very difficult, the powder particles are not uniformly distributed in the liquid and are even agglomerated, and certainly, the powder particles enter the liquid at this stage, so this stage can also be regarded as a pre-mixing stage of the solid and the liquid. In the dispersing stage, the wetted or premixed suspension is then subjected to dispersing treatment, so that the distribution consistency of the powder particles in the suspension meets the production requirement. At this stage, dispersion of agglomerates, blocks and the like possibly existing in the suspension is completed mainly by utilizing strong shearing force, and the powder particles are uniformly distributed into all the liquid participating in mixing. However, the requirements of the wetting process and the dispersing process on a mixing device are inconsistent, and under the condition, a good mixing effect cannot be achieved by adopting a single mixing mode, so that the wetting process and the dispersing process of the powder in the liquid in the prior art are respectively completed by special devices to ensure that a better mixing effect is achieved.

Therefore, in the field of solid (powder) and liquid mixing, especially in the field of mixing liquid and ultrafine powder to form a high-viscosity and high-concentration suspension, a mixing device which integrates powder wetting and efficient dispersion, and is good in mixing dispersion effect, simple in structure, low in energy consumption and high in treatment capacity is urgently needed.

SUMMARY

In a first aspect, the disclosure provides an impeller assembly for a solid-liquid mixing device including an impeller. The impeller includes a truncated conical body, and multiple mixing blades being formed from top to bottom on an inclined surface of the body, where the impeller assembly further comprises at least two blocking plates provided on an outer side of a lower portion of the body. One of the at least two blocking plates is fixed on the impeller of the impeller assembly, and another one of the at least two blocking plates is fixed on a housing of the mixing device. Gaps between the at least two blocking plates, gaps between the one of the at least two blocking plates on the impeller and the housing, and gaps between the another one of the at least two blocking plates on the housing and the impeller jointly form flow channels (8) of a suspension.

In a second aspect, the disclosure provides a solid-liquid mixing device using the above impeller assembly. The solid-liquid mixing device further includes a housing, at least one solid supply apparatus, at least one liquid supply apparatus, a mixing chamber, and a dispersion chamber. The at least one solid supply apparatus coveys a solid to a mixing chamber through a solid conveying chamber. The at least one liquid supply apparatus conveys a liquid to the mixing chamber through a liquid distribution chamber. The mixing chamber is defined by corresponding portions of the body and the housing, where rotation of the impeller mixes the solid and the liquid so as to form a suspension. The dispersion chamber is provided between a flow channel outlet at a lower portion of the mixing chamber and a discharging apparatus, and is defined by a portion of the impeller assembly other than the body and a corresponding portion of the housing, where a shearing effect of the blocking plate disperses the suspension flowing out of the mixing chamber.

BRIEF DESCRIPTION OF THE DRAWINGS

In order to illustrate the technical scheme in the embodiment of the present disclosure or in the prior art more clearly, the attached figures needing to be used in the embodiment or in the description in the prior art are simply described. Apparently, the embodiments in the following description are merely a part rather than all of the embodiments of the present disclosure. For any person skilled in the art, under the premise of without contributing creative labor, other attached figures further can be obtained according to these attached figures.

DETAILED DESCRIPTION OF THE EMBODIMENTS

In order to make the objectives, principles, technical solutions and advantages of the present disclosure clearer, the present disclosure will be further described herein below with reference to the attached figures and embodiments thereof. It is to be understood that the specific embodiments described herein are illustrative of the present disclosure and are not intended to limit the present disclosure, as described in the content of the present disclosure.

It should be particularly noted that, the connection or positional relationship can be determined according to the text or technical content of the specification, a position change diagram is partially omitted or not drawn for simplicity of drawing, and the position change diagram that is omitted or not drawn is not explicitly described in this specification and cannot be considered as not described. For the sake of brevity of explanation, no one is required to be explained when specifically stated, and the same is described herein in a unified manner.

Figure 1:
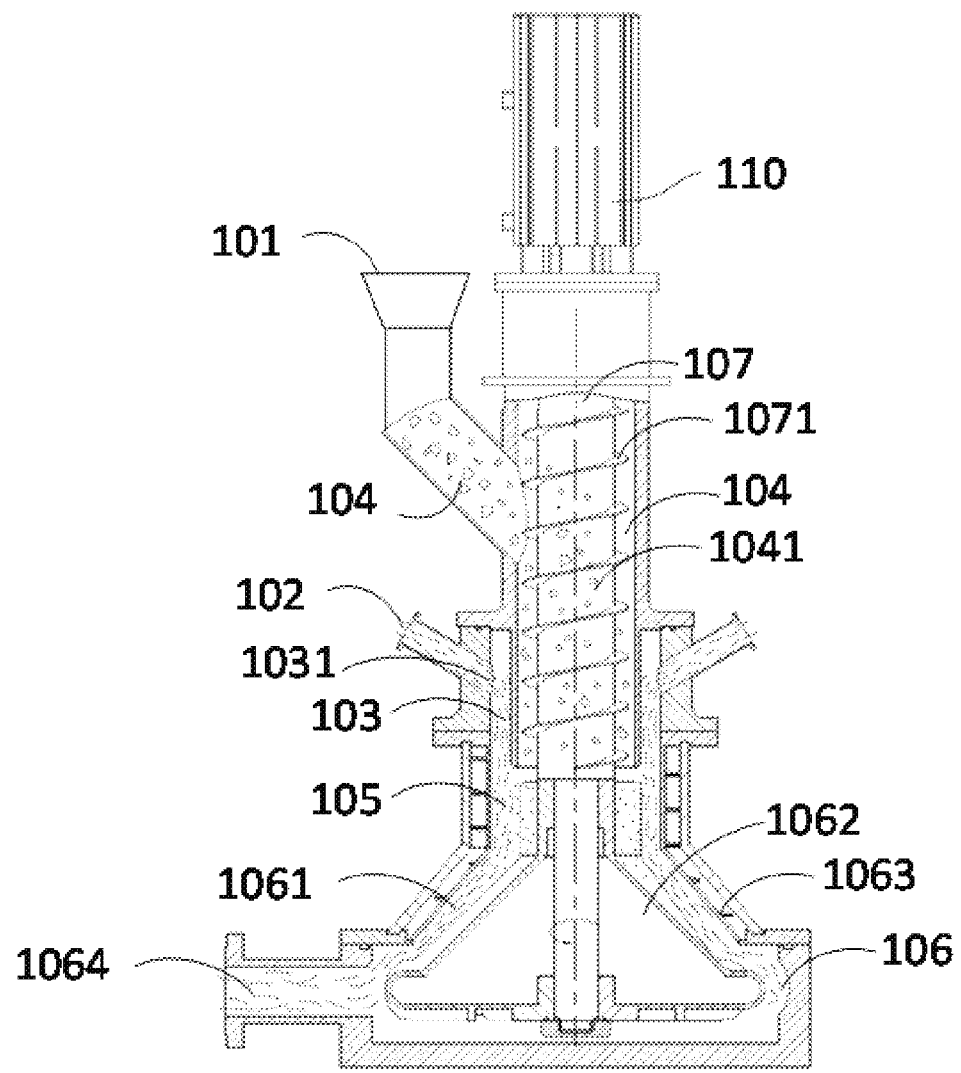
FIG. 1 is a schematic diagram of a solid-liquid mixing device in the prior art.

CN109173815A discloses a device for mixing solids and liquid, as shown in FIG. 1, the device comprises a solid supply apparatus 101; a liquid supply apparatus 102; a liquid distribution chamber 103 in which the supplied liquid is distributed at a predetermined flow rate; a solid conveying chamber 104, conveying the solids from the solid supply apparatus to the mixing chamber 105 by means of a screw feeding apparatus 1041; a mixing chamber for mixing the supplied solids with the liquid to form a suspension; and a rotor chamber 106 in which the suspension is rotated and output from an outlet of the rotor chamber, wherein a vacuum state in the working area is formed, so that a suction effect is generated in an inlet area of the rotor chamber, air on the surfaces of the supplied solids is substantially discharged through the suction effect, the air on the surface powder leaves away from the powder before the powder makes contact with the liquid, and then the powder is in contact with liquid to realize sufficient and rapid wetting of the powder. However, the device can only complete the wetting process and preliminary dispersion of the powder, although a large amount of gas in the powder is sucked away and is beneficial to wetting of the powder, the problem is that part of the powder is not fully dispersed in the liquid due to the fact that the stirring effect is not strong and the shearing force on the suspension is weak, so the obtained suspension cannot be directly used for actual production in many conditions. A high-speed dispersion process needs to be carried out again, so that powder particles forming agglomerates are thoroughly and uniformly dispersed into the suspension.

Figure 2:
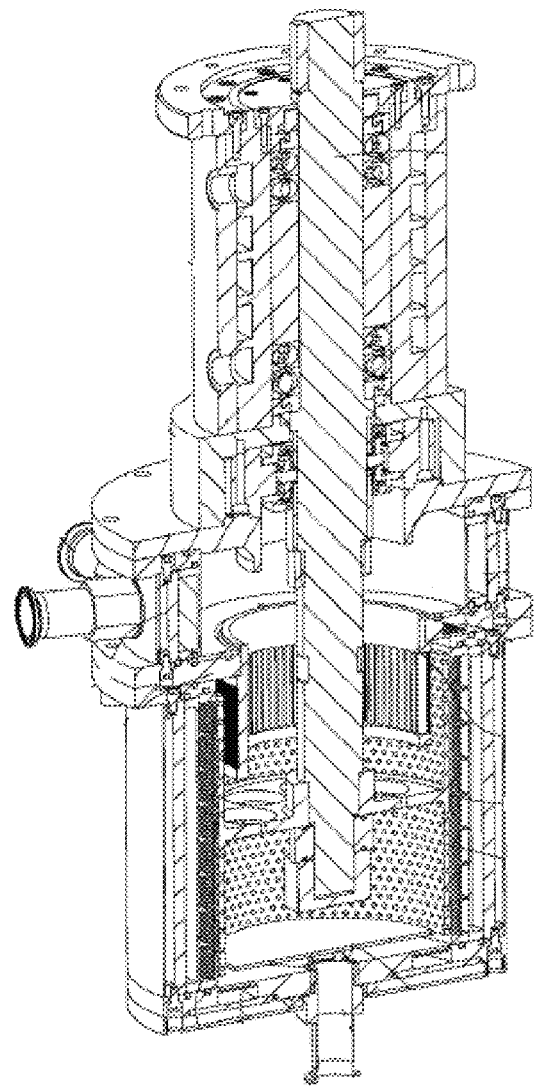
FIG. 2 is a schematic diagram of another solid-liquid mixing device in the prior art.

CN105148766B discloses a high-speed dispersion apparatus, as shown in FIG. 2, the high-speed dispersion apparatus comprises a dispersing barrel with an inlet in the lower end, a dispersing wheel arranged in the dispersing barrel, and a main shaft for driving the dispersing wheel, the main shaft extends towards the upper part of the dispersing barrel and is in transmission connection with a driving source, a striker plate is arranged at the upper end of the dispersing barrel, and a discharge barrel with a discharge cavity is arranged above the striker plate. The high-speed dispersion apparatus also comprises a flow guide plate arranged above the inlet and is positioned at the lower end of the dispersing wheel. According to a method, materials needing to be dispersed are conveyed to a gap between the high-speed rotating dispersing wheel and the fixed dispersing barrel through the blocking and flow dividing effect of the flow guide plate from the inlet, the materials are dispersed and moved to the position above the dispersing wheel, and the dispersed materials flow to a discharge cavity after being filtered through a cylindrical filtering structure and flow out through an outlet; and the materials which do not pass through the cylindrical filtering structure are blocked to an inner cavity of the dispersing wheel and are dispersed and mixed again. The high-speed dispersion apparatus has the advantages of long dispersing time and good dispersing effect, but has the defects that the apparatus is an independent apparatus, can only complete slurry dispersion work, cannot complete solid-liquid pre-mixing work, and then cannot complete air extraction from the surface of powder to achieve efficient wetting of powder, so that the powder is difficult to disperse in the liquid, and long time is required for dispersion results in high energy consumption required for dispersion of the powder in the liquid. The motor is high in rotating speed, large in energy consumption, large in size, complex in structure and obvious in high cost because an independent feeding unit and an independent discharging unit are needed.

Figure 3:
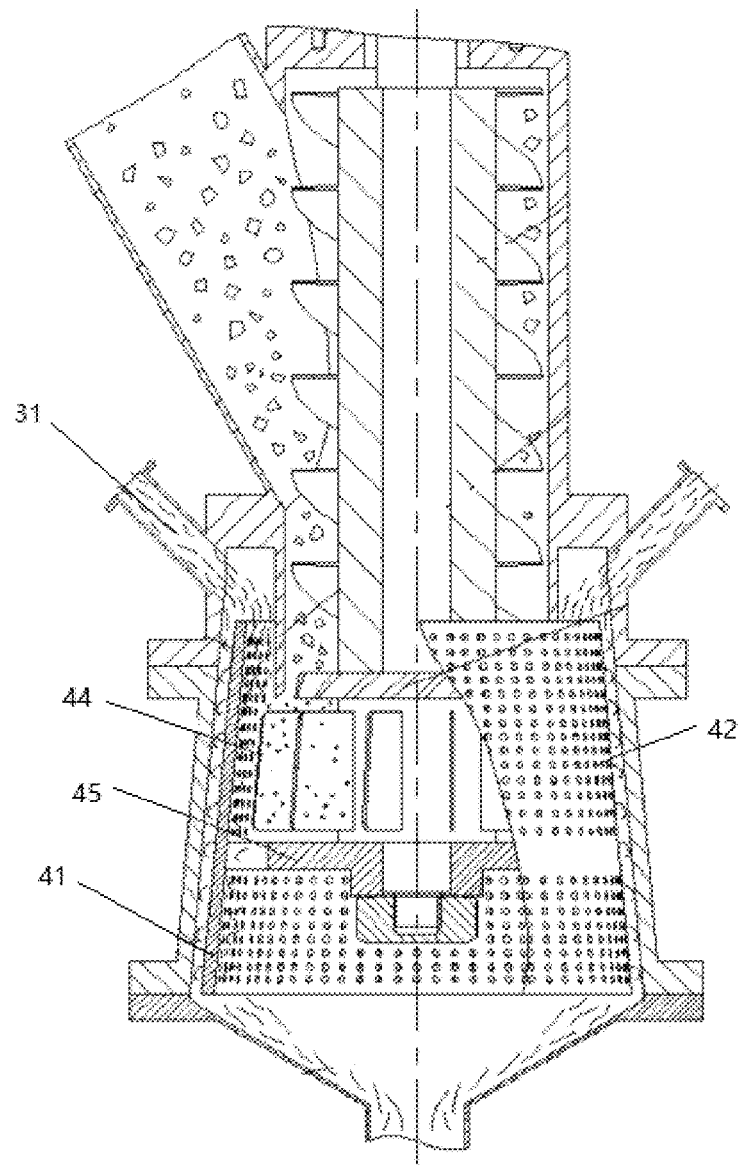
FIG. 3 is a schematic diagram of another solid-liquid mixing device in the prior art.

CN207667471U of the company discloses a solid-liquid mixing device suitable for high-viscosity materials, as shown in FIG. 3, the solid-liquid mixing device comprises a spiral feeding module, a liquid distribution module and a mixing and dispersing module, wherein the spiral feeding module is positioned in a housing and used for conveying to-be-mixed powder; the liquid distribution module is positioned on the circumference of the upper part of the housing and used for injecting liquid to be mixed into the housing; the mixing and dispersing module is positioned in the housing, arranged at the lower end of the spiral feeding module, and used for dispersing and/or crushing and mixing to-be-mixed powder and to-be-mixed liquid; the mixing and dispersing module comprises a dispersing cylinder and a dispersing disc, the dispersing disc is coaxially and fixedly connected in the dispersing cylinder, and the dispersing cylinder, the dispersing disc and the spiral feeding module rotate coaxially; a slit is formed between the dispersing cylinder and the inner wall of the housing, and a plurality of dispersing holes are uniformly distributed in the outer wall of the dispersing cylinder. Powder to be mixed and liquid are dispersed and/or crushed and mixed by mixing blades 44 and the dispersing disc 45 in the mixing and dispersing module, the powder and the liquid reach the slit through the dispersing holes 42 formed in the outer wall of the dispersing cylinder 41, and the solid-liquid mixture is subjected to strong shearing action when passing through the dispersing holes 42 to open and disperse agglomerated particles. The working principle of the equipment is as follows: the liquid flowing into a liquid feeding pipe 31 is stirred and rotated by utilizing the rotation of the dispersing cylinder 41 to form a liquid film on the surface of the dispersing cylinder, the powder is bitten onto the dispersing cylinder 41 by utilizing the mixing blades 44 to form a suspension, and then the suspension is further mixed and dispersed by the dispersing cylinder at the lower part. However, through verification of actual production, although the mixing effect of the mixing device is improved compared with that of an old device, the mixing device also has several defects that firstly, due to the fact that common blades are adopted for beating powder onto the dispersing cylinder, gas wrapped around the powder is not treated in a targeted mode, the wetting of powder is poor, and more residual gas is left on the surface; under the condition that the air on the surface of the powder is not evacuated to the maximum extent, the dispersing cylinder prematurely intervenes in the premixing work, so that powder agglomerates which are not fully wetted are thrown to the dispersing cylinder 41 by the mixing blades 44, the dispersing holes 42 are easily blocked, a good mixing effect cannot be achieved, and the subsequent dispersion procedure is affected; secondly, when the powder just enters the area where the stirring blades and the dispersing cylinder are arranged, a lot of powder agglomerates are not fully scattered, but the distance between the blades and the cylinder wall is very short, so that part of the powder agglomerates are directly thrown to the dispersing cylinder without being scattered, the dispersing holes are blocked, and the treatment speed and capacity of the whole device are reduced and even halt is caused; and thirdly, because the same main shaft and motor are used for the mixing blades, the dispersing cylinder and the dispersing disc, a truncated conical impeller is not adopted, the linear speed of the bottom edge of the impeller is not high, the mixing and throwing effects are both affected, effective vacuum cannot be formed at the outlet, the downward flow speed of the suspension is not high, and the treatment speed is not ideal.

Another patent CN108465388A of the company discloses a device for mixing solids and liquid, the device comprises a liquid distribution module, a powder dispersion module, a solid-liquid mixing module and a discharging module. The liquid distribution module is used for conveying liquid to be mixed to the mixing module; the powder dispersion module is used for dispersing and/or pulverizing the powder to be mixed and then discharging the mixture into the solid-liquid mixing module; and the liquid to be mixed and the powder to be mixed are mixed in the solid-liquid mixing module, are rapidly rotated and are discharged by the discharging module. The mixing device is actually similar to the technical scheme of the previous patent, namely, an independent discharging apparatus is additionally arranged on the basis of the previous patent, but the discharging apparatus only plays a role in discharging, so that the defect of the discharging speed of the previous patent is overcome. However, an effective solution cannot be provided for other defects, particularly, no further shearing dispersion is carried out on the suspension, and the mixing and dispersing effects on ultrafine powder are not ideal.

As for a traditional mixing device, stirring blades of the mixing device are generally equal in diameter, that is, strong rotating impact force and shearing force can be generated in the horizontal direction. Therefore, some structures capable of enhancing the mixing effect, such as cylindrical blocking plates, are arranged on the side of the unidiameter stirring blades in the prior art. However, defects of this design are also obvious, such as blockage of blocking plates and reduction of the vertical conveying speed of a solid-liquid mixture, which have been described in detail in the background section and are not described in detail herein.

Figure 4:
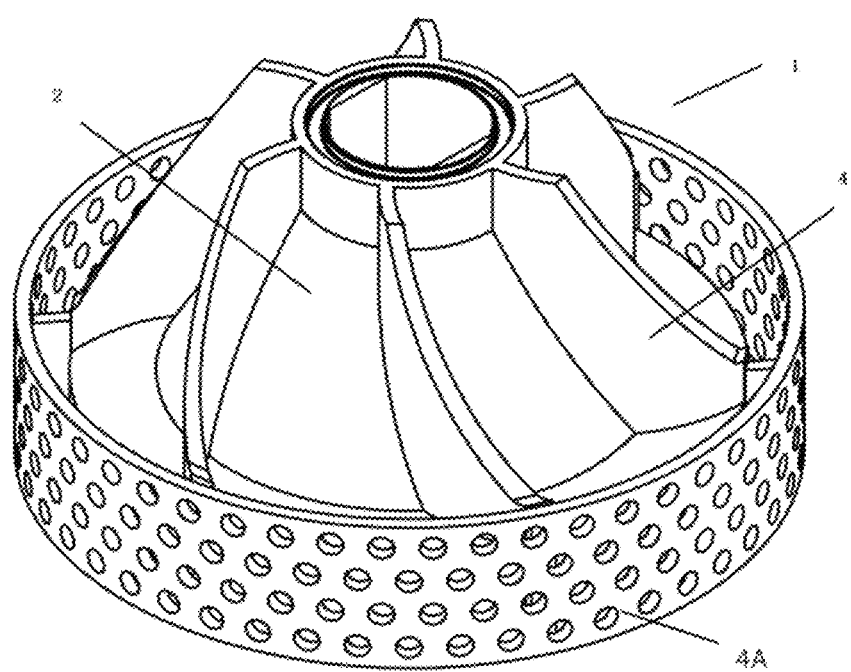
FIG. 4 is a schematic diagram of an impeller assembly in another application of the company.
Figure 5:
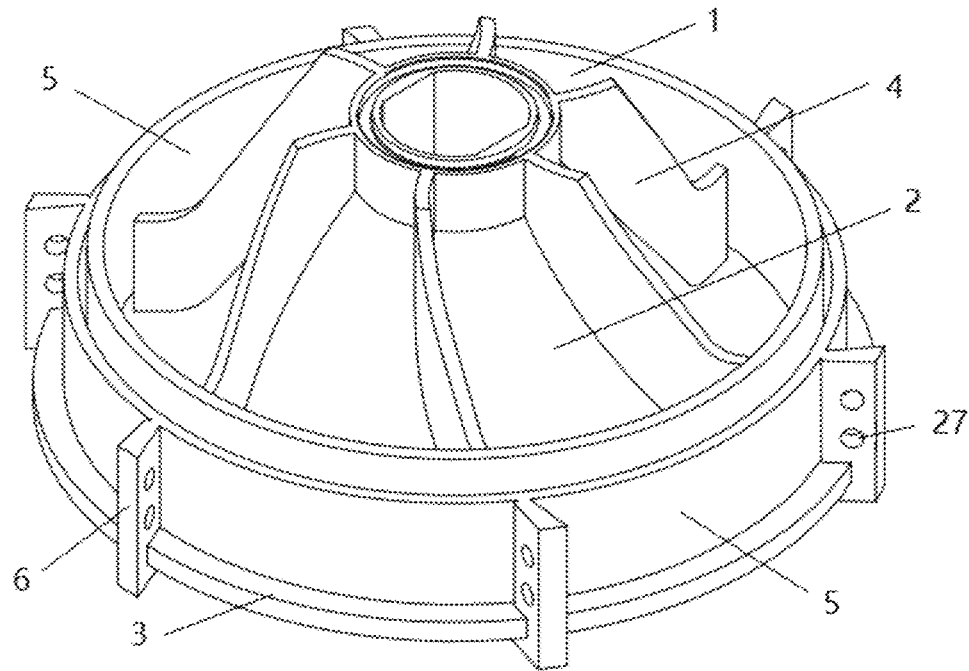
FIG. 5 is a schematic diagram of an impeller assembly in an embodiment of the present disclosure.

Another impeller assembly for a solid-liquid mixing device is depicted in FIG. 4. The impeller assembly comprises an impeller 1, the impeller 1 comprises a truncated conical body 2, multiple mixing blades 4 are formed from top to bottom on an inclined surface of the body 2, the impeller assembly further comprises a perforated plate 4A provided on an outer side of a lower portion of the body, and the perforated plate 4A is fixed on a housing of the mixing device or the impeller of the impeller assembly. The perforated plate 4A is additionally arranged on the channel where a suspension is thrown out forcefully, so that high-speed shearing of the suspension is achieved, and the dispersion effect of high-viscosity liquid generated by mixing ultrafine powder and a small amount of liquid is obviously improved. The characteristics of the present application lie in that only one perforated blocking plate is arranged, and the shearing capacity of the suspension is improved to a certain extent. Previous researches have considered that one perforated plate 4A can have a good effect of increasing shear strength, the interior space of the mixing device is relatively narrow, and if a considerable number of holes are not formed in the plate or too many components are provided, rapid treatment of the viscous suspension is not facilitated, and the treatment speed can be affected. Meanwhile, if multiple perforated plates 5 are arranged, the flowing speed of the suspension can be seriously reduced, the throwing-out speed of the suspension penetrating through the two perforated plates 5 is too low, and a good shearing effect cannot be achieved. However, through continuous tests of the inventor and improvement of technological parameter, it is found that even a blocking plate without a hole can achieve the effect of remarkably improving the shear strength if designed properly. Due to the fact that the blocking plate without a hole enables the movement path of the suspension to be greatly bent, the suspension is thrown out of flow channels formed by the gaps between the blocking plates and the housing after being blocked and extruded by the multiple parts, and the technical effect of enhancing the dispersion effect can also be achieved. Meanwhile, although the design of multiple blocking plates greatly influences the final throwing-out speed of the suspension, the cross-sectional area of a discharging channel is not greatly reduced, the overall suspension treatment speed is not greatly influenced, and adverse effects can be completely overcome by adjusting some technological parameters and forming a proper number of holes in the blocking plates. Through continuous test verification and analysis, it is found that the multiple blocking plates remarkably prolong the movement route and time of the suspension in a dispersion chamber, and the mixing and dispersing effects are greatly enhanced through rotary shearing between the blocking plates and the housing.

Aiming at the problems, a solid-liquid mixing device is designed by the inventor, and a truncated conical impeller and unequal-diameter blades are adopted, so that the linear speed of a suspension after the suspension passes through the impeller is obviously increased, and the mixing effect and the discharging speed are well considered. However, the dispersion consistency of the mixing device cannot meet the production requirements when some raw materials are adopted, so that organic integration of the mixing function and the dispersion function is completed by utilizing the original structure and working mode of the mixing device and only by additionally arranging at least one blocking plate without a hole, but not simply connecting two separate devices into a large device.

As shown in FIG. 5 to FIG. 10, the improved impeller assembly is used in the solid-liquid mixing device. The impeller assembly comprises an impeller 1, the impeller 1 comprises a truncated conical body 2, multiple mixing blades 4 are formed from top to bottom on an inclined surface of the body 2, and the impeller assembly further comprises at least blocking plate 5 provided on an outer side of a lower portion of the body 2. When at least two blocking plates 5 are provided, the blocking plates 5 are fixed to the housing 14 of the mixing device and the impeller 1 of the impeller assembly respectively. Further, holes 25 are formed in the at least one blocking plate 5. Gaps between the blocking plates 5, the holes 25 and gaps between the blocking plates 5 and the housing 14 jointly form flow channels 8 of the suspension.

Figure 7:
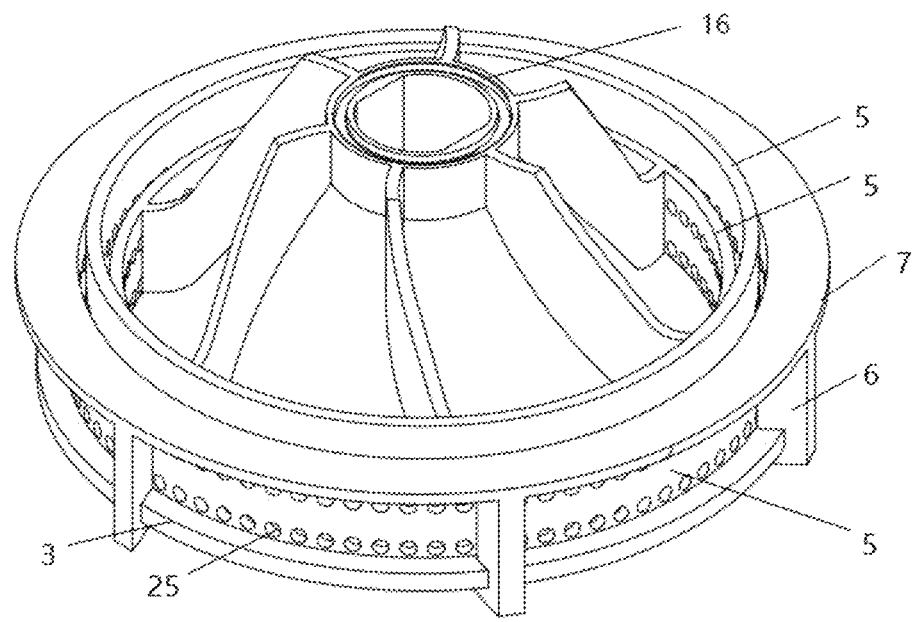
FIG. 7 is a schematic diagram of an impeller assembly in an embodiment of the present disclosure.

In the present disclosure, at least one blocking plate 5 is arranged, the blocking plate 5 can be fixed to the housing 14 of the mixing device or the impeller 1 of the impeller assembly, and it is noted that if the blocking plate 5 is fixed on the impeller, a gap must be left between the blocking plate 5 and the shell and if the blocking plate 5 is fixed on the shell, a gap must be left between the blocking plate 5 and the impeller body. When two blocking plates 5 are arranged, at least one blocking plate is fixed and at least one blocking plate rotates, and certainly three blocking plates 5 can be arranged as shown in FIG. 7, the inner and outer blocking plates 5 rotate along with the impeller 1, and the middle blocking plate 5 is fixed and does not move, a strong rotary shearing effect is formed during working, and the suspension can be repeatedly sheared, rubbed and extruded in the long and narrow flow channel 8 of the suspension, so that the agglomerates in the suspension are fully scattered, and finally slurry in a good state is formed. The blocking plate 5 is usually a smooth plane, but some grooves or knurls can be processed on the smooth blocking plate 5, so that the effect of enhancing the shearing effect can be achieved. In another embodiment, multiple holes 25 may also be formed in the blocking plate 5 for increasing the shearing action in the radial direction. Meanwhile, the flowability of the suspension also can be increased to a certain extent, the number of the blocking plates provided with holes 25 is not limited, and one or two or all blocking plates may be provided. The positions of the holes 25 between every two adjacent blocking plates 5 are mutually staggered as much as possible in the axial direction, and the holes 25 are generally arranged layer by layer in the height direction, so that axial staggering means that each layer of holes 25 between every two adjacent blocking plates 5 are staggered in the axial (namely height) direction, preventing some part of the suspension is thrown out of the outermost blocking plate 5 without being sufficiently sheared. In addition, due to the arrangement of the multiple blocking plates, the suspension can flow up and down between the blocking plates 5 through the housing 14, the base plate 3 and the like, and it is guaranteed that the flow channels 8 through which the suspension can move up and down are formed between the blocking plates 5. For example, the suspension enters the flow channel 8 between the inner blocking plate 5 and the middle blocking plate 5 from the flow channel 8 at the upper end of the inner blocking plate 5, moves downwards to the bottom end, flows into the flow channel 8 between the middle blocking plate and the outer blocking plate, and finally is thrown out through the flow channel 8 at the upper end of the outer blocking plate 5 to fully receive the shearing and friction of the blocking plates. Further, the gaps between the blocking plates 5, the holes 25, the gaps between the blocking plates 5 and the housing 14, and the gaps between the blocking plates 5 and the base plate 3 may all form the flow channels 8 of the suspension. However, the gaps must not be too large, otherwise, the shearing effect will be affected, preferably, the gaps between the upper or lower end faces of the blocking plate 5 and the housing 14 are 2-5 mm, and the gap between every two adjacent blocking plates 5 is 1-5 mm.

In the present disclosure, the impeller 1 is intended to comprise a truncated conical body 2, since the impeller 1 is present as a rotor and is inevitably connected to the main shaft in the axial direction, and since the presence of the connecting structure occupies certain volume, the body 2 is generally present in the shape of a truncated cone, which, of course, can also be called as a truncated cone. In addition, in FIG. 7, it can be clearly seen that a cylindrical connecting part exists 16 on the top of the impeller 1, but the connecting part 16 is not necessarily a part, and the connecting part to the main shaft 21 can be designed completely inside the truncated conical body 2, and in terms of the present disclosure, the arrangement of the connecting part 16 can be chosen freely. In addition, a relatively small bottom edge may be arranged at the bottom of the body 2 according to technological requirements, but has little influence on the overall shape of the impeller, and can be removed if necessary. The mixing blades 4 may be provided starting from the connecting part 16 and also starting from the body 2. However, regardless of the design, the heights of the mixing blades 4 with respect to the body 2 are substantially the same. Meanwhile, the shape of the housing 14 is matched with the inclined shape of the impeller 1, so that the suction effect emphasized in the present disclosure can be achieved. Here, the lower part is just a term indicating the approximate position, and the meaning of the lower part is better understood if the whole impeller 1 is divided into three parts from top to bottom, namely an upper part, a middle part and a lower part. Of course, the shape of the blocking plate 5 in the actual design is not necessarily a standard cylindrical shape and can be changed to a certain extent following the shape of the impeller body 2, the base plate 3 and even the housing 14.

The annular base plate 3 can play a role in guiding the movement direction of the suspension. Because the suspension is inclined at a high speed after being discharged from the mixing chamber and rotates towards the bottom shell part of the housing 14, and the blocking plate 5 is generally vertically arranged, so that the suspension cannot directly rush onto the blocking plate 5. At the same time, part of the suspension is directly discharged out of the dispersion chamber through the gaps. Therefore, in order to avoid disordered flow of the suspension, and also to ensure that all of the suspension passes through the blocking plates 5 or enters the flow channels 8 between the blocking plates 5 at a high speed and a proper angle, we consider to fully utilize the action of the bottom surface of the housing 14, or to add a base plate 3 extending horizontally outward at the bottom of the impeller 1. In addition, the annular base plate 3 may also play a role in fixing or placing the blocking plates 5, and at least one blocking plate 5 may be fixed to the annular base plate 3 by means of an annular mounting flange, or, of course, directly welded to the annular base plate 3.

Due to the fact that the part (the blocking plate 5) for blocking normal flow of the suspension is additionally arranged on the flowing channel of the suspension, the flowing speed of the suspension is obviously reduced to a certain extent. However, the treatment speed of the mixing chamber 11 is not reduced even the channel behind the mixing chamber 11 is blocked. Therefore, in order to maintain the treatment speed of the entire mixing device, referring to FIG. 5 to FIG. 10, multiple discharging blades 6 are arranged on the outer side of the outermost blocking plate 5 in the radial direction approximately, the discharging blades 6 can be directly fixed to the outermost rotating blocking plate 5 or to the annular base plate 3. Of course, it is also possible to directly fix the multiple discharging blades 6 on the lower end face of the body 2 in radial direction approximately. In the present disclosure, it is generally possible to understand the multiple blades on the outer side of the outermost blocking plate 5 as discharging blades 6 and the blades on the inner side of the blocking plate 5 as mixing blades 4 from the point of view of realizing the functions. As shown in FIG. 7, an annular top plate 7 is fixed above the discharging blades 6, and the discharging blades 6 are arranged between the top plate 7 and the base plate 3, so that the top plate 7 and the base plate 3 together define a suspension discharging channel. Because the discharging blades 6 have certain heights and radial lengths, and the top plate 7 is also basically parallel to the base plate 3 and is matched with the outer side part of the base plate 3, a basically closed annular suspension flow channel is formed on the outer side of the blocking plate 5, and the suspension passing through the blocking plate 5 can completely enter the suspension discharging channel jointly defined by the top plate 7 and the base plate 3. In some cases, the discharging blades 6 may also be fixedly connected to the impeller 1 through the top plate 7. The discharging blades 6 are introduced, and equivalently, the diameter of the blade at the bottom of the impeller 1 is increased. The discharging blades 6 are driven by the base plate 3 to rotate at a high speed. Under the cooperation of the housing 14, the effect similar to that of a centrifugal pump is generated, negative pressure is formed on the outer side of the blocking plate 5 through the generated centrifugal effect, liquid on the inner side of the blocking plate 5 is accelerated to flow to the outer side, so that the process of the suspension passing through the blocking plate 5 becomes rapid and easy. In this way, the kinetic energy loss caused by the additional arrangement of the blocking plate 5 is effectively compensated through the discharging blades 6. The blocking plate 5 is arranged on the inner side of the discharging blade 6, so that the outer edge of the discharging blade 6 can be designed to be very close to the inner wall of the housing 14, it can be guaranteed that all of the suspension passes through the blocking plate 5, it can also be guaranteed that enough negative pressure is generated in the dispersion chamber, and high treatment speed is maintained.

Preferably, the discharging blades 6 are bent in substantially the same direction as the mixing blades 4, and holes 27 are formed in the discharging blade 6. The number of the mixing blades 4 and the number of the discharging blades 6 are not particularly limited, but when the discharging blades 6 and the mixing blades 4 are bent in the same direction, the flow of the suspension is less obstructed, and the speed loss is less. Furthermore, due to the fact that the treated material is typically high-viscosity slurry, the arrangement of the holes 27 in the discharging blades 6 can provide additional circumferential shear force and also avoid high pressures and high load inside the dispersion chamber 15 that are disadvantageous to the device, helping to discharge the high-viscosity slurry smoothly.

Figure 6:
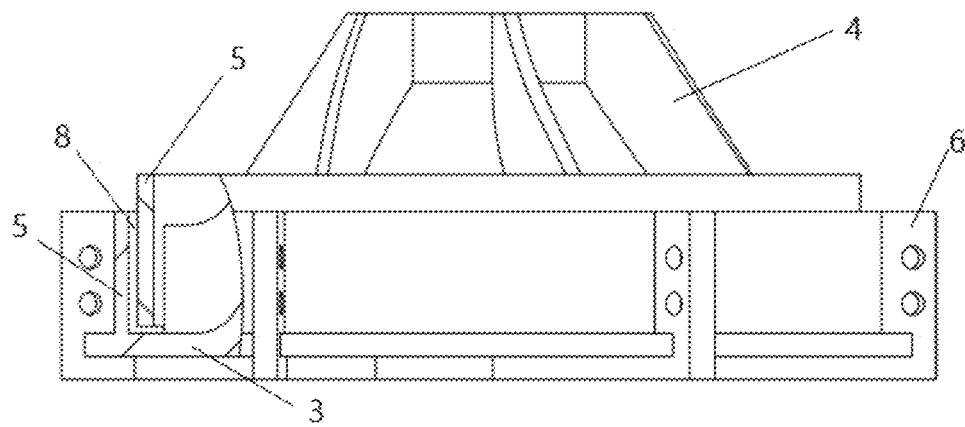
FIG. 6 is a schematic diagram of an impeller assembly in an embodiment of the present disclosure.
Figure 8:
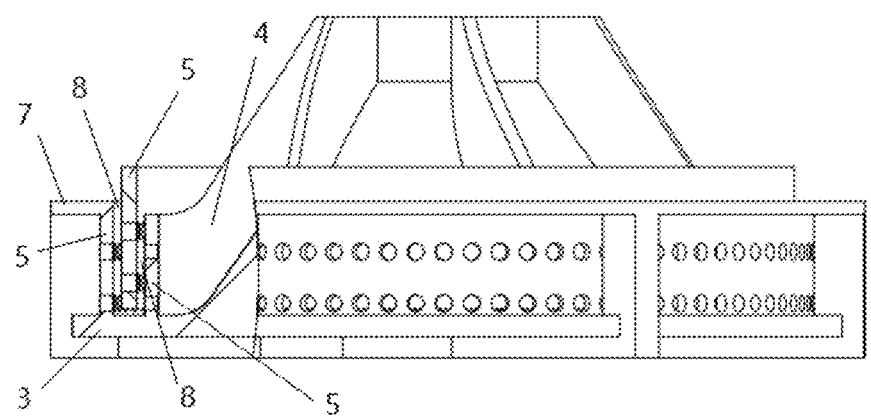
FIG. 8 is a schematic diagram of an impeller assembly in an embodiment of the present disclosure.
Figure 9:
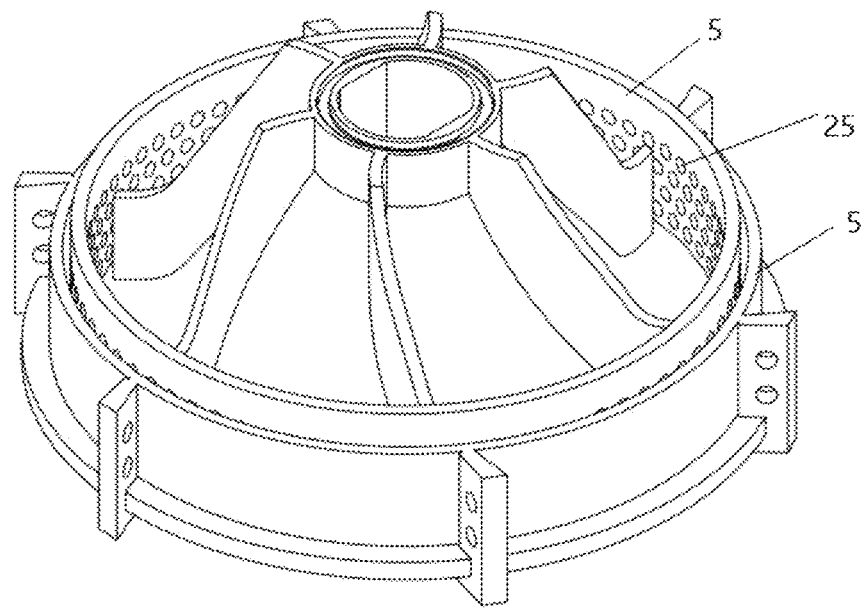
FIG. 9 is a schematic diagram of an impeller assembly in an embodiment of the present disclosure.
Figure 10:
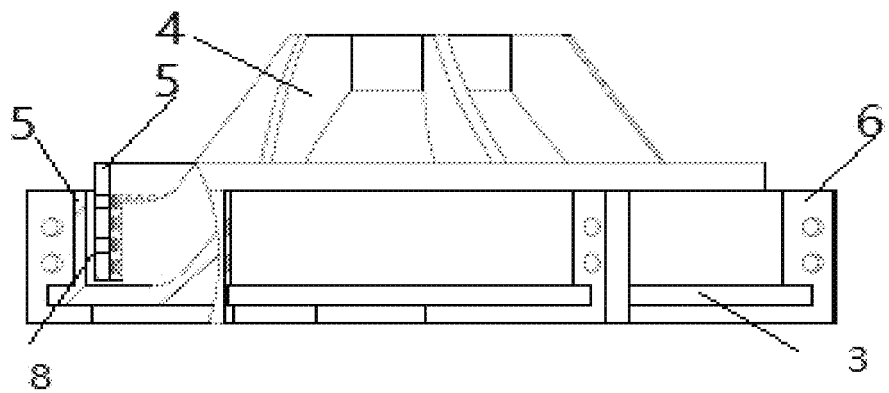
FIG. 10 is a schematic diagram of an impeller assembly in an embodiment of the present disclosure.

Referring to FIG. 6 and FIG. 8, the mixing blade 4 may extend horizontally at a distance in the lower portion of the body 2, and the discharging blade 6 is integral with the portion of the mixing blade 4 extending horizontally in the lower portion of the body 2. By means of the fixed connection design, the distance between the edge of the mixing blade 4 and the inner blocking plate 5 is reduced to the minimum, the suspension can be well stirred, guided and accelerated, the suspension can be thrown out into the flow channel at a higher speed through the lengthened blade, and the shearing action of the blocking plate 5 is amplified. Meanwhile, the mixing blades 4 and the discharging blades 6 can be connected into a whole through a small section of connecting rib, and the overall structure of the impeller assembly is simplified without the need of a base plate 3 or a top plate 7.

The height of the blocking plate 5 substantially coincides with the height of the horizontal extension part of the mixing blade 4 on the base plate 3, mainly in order to substantially define the height of the blocking plate 5, the blocking plate 5 cooperates with the surrounding components, and finally the gaps between the blocking plates 5, the holes 25, the gaps between the blocking plates 5 and the housing 14 and the gaps between the blocking plates 5 and the base plate 3 jointly form the flow channels 8 of the suspension.

Figure 11:
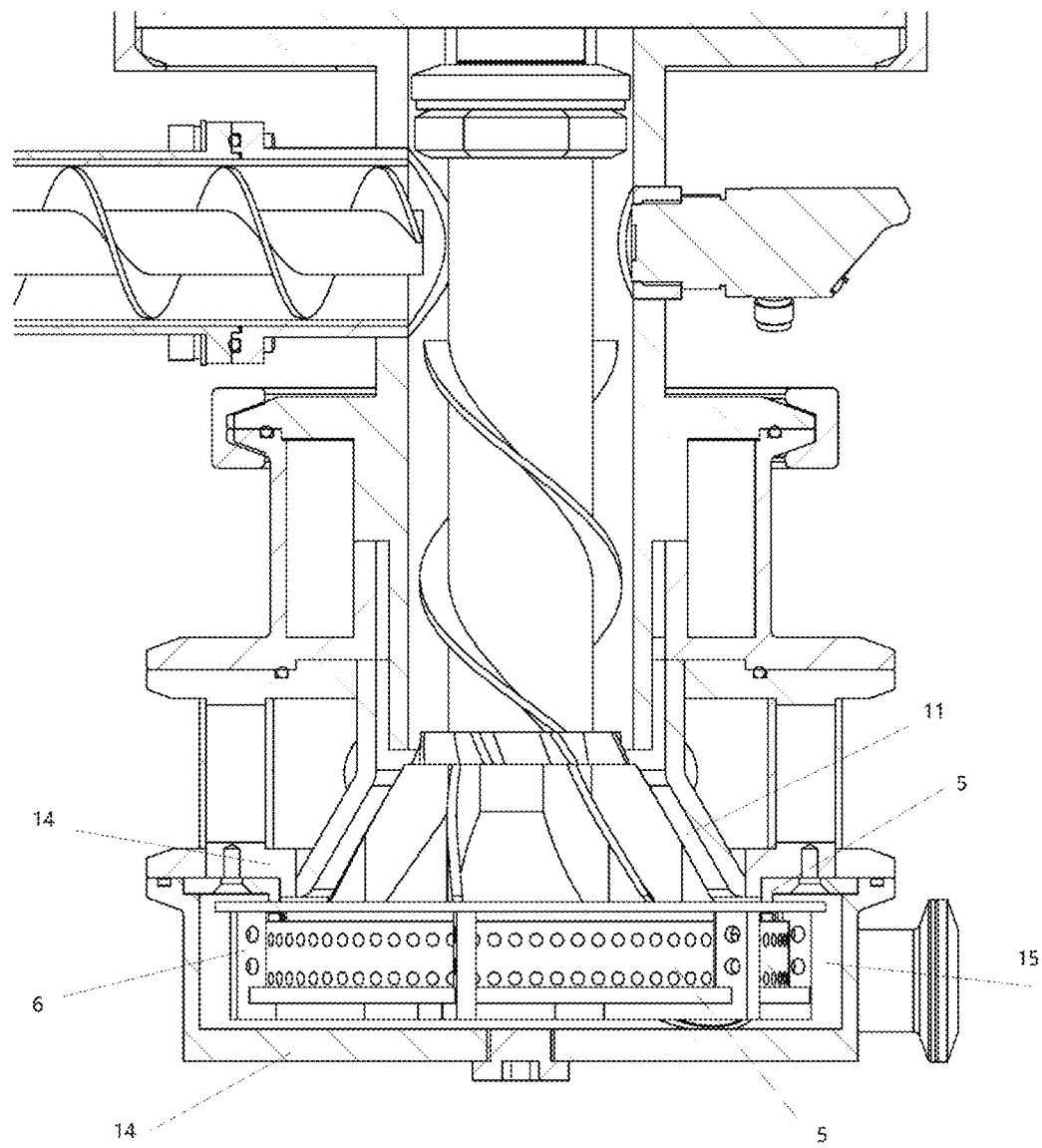
FIG. 11 is a profile schematic diagram of a mixing device in an embodiment of the present disclosure.
Figure 12:
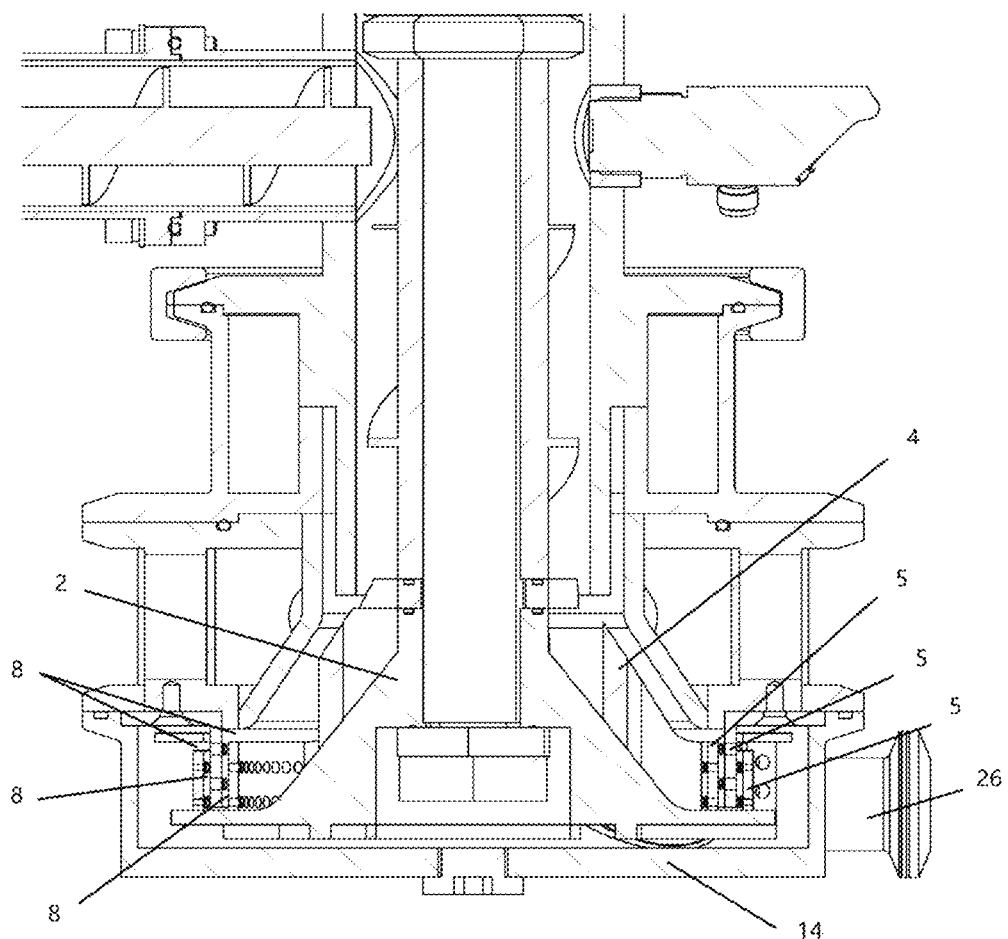
FIG. 12 is a profile schematic diagram of a mixing device in an embodiment of the present disclosure.
Figure 13:
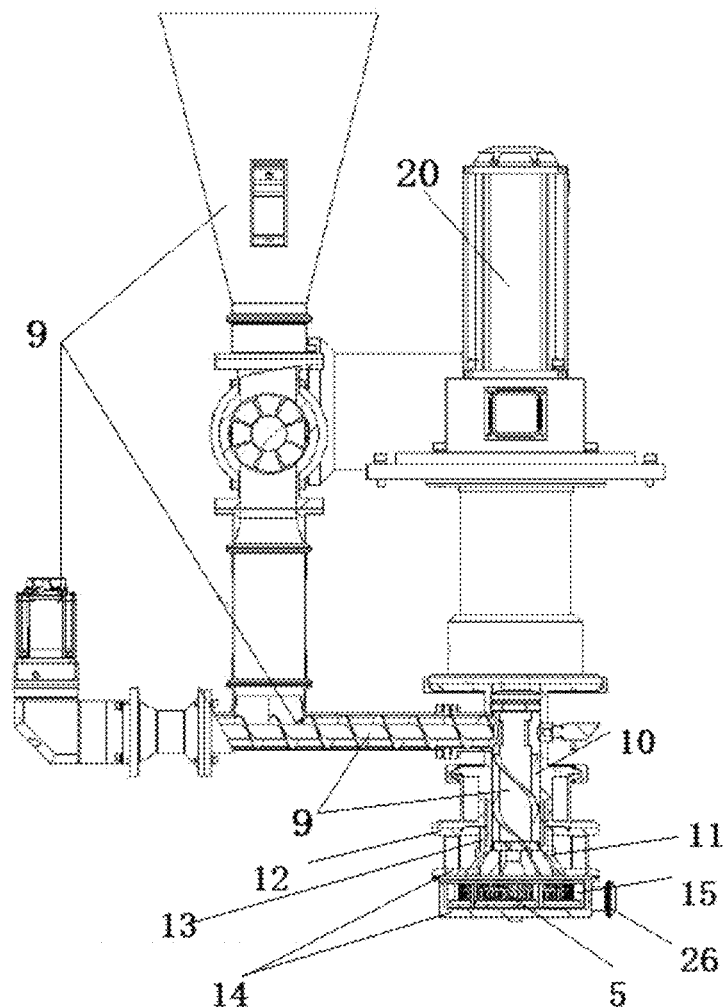
FIG. 13 is an integral schematic diagram of a mixing device in an embodiment of the present disclosure.

As shown in FIG. 11 to FIG. 13, in certain mounting conditions, for example, when it is desired to mount the blocking plate 5 to the housing 14, the blocking plate 5 is generally provided with an annular mounting flange, and the mounting flange is undoubtedly a good choice to achieve stability. Of course, it is also possible to mount the blocking plate 5, which needs to be rotated, to the base plate 3 by using the flange; and the blocking plate 5 is more flexible and more convenient to replace and repair than being directly welded to the housing 14, the base plate 3 or the top plate 7, or even the mixing blades 4.

Without the base plate 3 of the impeller 1, the mixing blades 4 can horizontally extend at a certain distance on the lower end face of the body 2, and can also enhance the mixing effect, increase the flow rate and guide the suspension to enter the flow channels. Designers can flexibly set the position and number of the mixing blades 4. Parameters such as the length, the shape and the bending degree can be flexibly adjusted according to actual requirements, and a larger design space can be provided for the designers. In addition, an embodiment that the mixing blades 4 are not arranged on the inclined surface of the body 2 also exists, and certain slurry production requirements can be met only through the rotary mixing effect of the impeller 1, so that the structure of the device is simplified, and the durability of the device is improved. Of course, under the design, the mixing blades 4 which are fixed to the lower end face of the body 2 and extend in the radial direction are independently introduced, the discharging speed of the suspension can also be greatly increased, and the defects that no mixing blade exists in the middle portion and the upper portion of the impeller and the impeller treatment discharging speed is insufficient can be overcome to a certain extent.

As shown in FIG. 11 to FIG. 13, the present disclosure is a solid-liquid mixing device. The solid-liquid mixing device comprises: a housing 14; at least one solid supply apparatus 9, conveying a solid to a mixing chamber 11 through a solid conveying chamber 10; at least one liquid supply apparatus 12, conveying a liquid to the mixing chamber 11 through a liquid distribution chamber 13; a mixing chamber 11, defined by corresponding portions of the body 2 and the housing 14, wherein rotation of the impeller 1 mixes the solid and the liquid so as to form a suspension; and a dispersion chamber 15 provided between a flow channel outlet at a lower portion of the mixing chamber 11 and a discharging apparatus 26, and defined by a portion of the impeller assembly other than the body 2 and a corresponding portion of the housing 14, wherein the friction and shearing effects of at least two blocking plates disperses the suspension flowing out of the mixing chamber 11. The blocking plates 5 are fixed to the housing 14 of the mixing device or the impeller 1 of the impeller assembly respectively.

The housing 14 of the mixing device is mainly used for supporting and acting as a chamber housing, such as for bearing and mounting the motor 20, the main shaft 21, the solid supply apparatus 9, the liquid supply apparatus 12 and the like. The housing 14 is usually formed by splicing several parts because the impeller 1, the blocking plates 5, the main shaft 21 and other components are required to be mounted inside the housing 14. After the mixing device is assembled, the housing 14 and the various components mounted on the housing 14 generally define several core chambers such as the solid conveying chamber 10, the liquid distribution chamber 13, the mixing chamber 11 and the dispersion chamber 15 from top to bottom. However, this definition merely represents a kind of artificially divided definition, primarily from the point of view of accomplishing the functions. In a practical mixing device, it is possible that the specific demarcation lines of the several chambers are not obvious, the specific shapes cannot be used to define the dispersion chamber and the like, but the several chambers are very clear from the relation of the positions of the several chambers, what components are made up, and what functions are achieved. It is important that the mixing chamber 11 approximately comprises the body 2 of the impeller 1 and the part of the housing surrounding the body 2, and the two parts approximately define a truncated conical space in which the ejected liquid and the scattered powder come into contact with each other and undergo preliminary mixing under the rotational stirring of the mixing blades 4. The dispersion chamber 15 may comprise other components of the impeller assembly such as the base plate 3, the blocking plates 5 the discharging blades 6, and the part of the housing surrounding these components, the two parts approximately define a cylindrical space in which the suspension thrown from the mixing chamber 11 passes through a channel formed by the base plate 3, the housing 14, the blocking plates 5, the top plate 7, and the like, and under the action of the discharging blades 6, the suspension is discharged to the discharging apparatus 26 to complete further shearing and dispersion of the suspension.

The solid supply apparatus 9 is used for conveying solids needing to be mixed from a feeding position to the mixing chamber 11. The solid supply apparatus 9 conveys solid raw materials (generally various powder raw materials) from a hopper or a stock bin to the mixing chamber 11 through the solid conveying chamber 10 by means of a screw feeding apparatus 22. The screw feeding apparatus 22 can continuously and uniformly feed the solids into the mixing chamber 11, so that the problems that when the solids and the liquid are in contact with each other in the mixing chamber 11, the solids is too many or too few, the solids are easily caked and blocked due to too many solids, and the increasing difficulty of wetting and uniform mixing of the solids and the liquid are avoided; the difficulty of uniformly mixing all the solids and the liquid in the same batch is increased due to too few solids, and the circular mixing times need to be increased to realize uniform mixing of all the solids and the liquid in the same batch. The screw feeding apparatus 22 is used for conveying the solids, on one hand, the influence of the suction effect of the mixing chamber 11 on the suction of the solids can be avoided, the solids can be continuously and uniformly conveyed into the mixing chamber 11 to be mixed with liquid, uniform mixing of the solids and the liquid in the same batch is achieved, and the number of cycles is reduced.

It is particularly noted that in the present disclosure, the solid feeding apparatus 9 should not be interpreted solely as a screw feeding apparatus, as long as a feeding apparatus capable of achieving uniform and continuous conveyance of solids can be applied in the present disclosure. In addition, under the condition that multiple types of solids need to be infiltrated and mixed, the mode that multiple screw feeding apparatuses are adopted by the solid feeding apparatus to convey the multiple types of solids respectively is the technical scheme within the protection range of the solid feeding apparatus.

The liquid supply apparatus 12 is used for storing and supplying liquid, wherein the liquid comprises a suspension in which the liquid and solids are mixed. There may be a plurality of liquid supply apparatuses 12, some of which supply liquid and some of which are used for supply of the suspension after the liquid becomes the suspension. The liquid distribution chamber 13 is used for distributing the liquid supplied by the liquid supply apparatus 12 at a preset flow rate, and it is guaranteed that the liquid in the liquid distribution chamber 13 is sufficient in flow rate and even in distribution. The distribution of the liquid flow rate can be achieved by adjusting the number of inlet nozzles of the liquid distribution chamber 13 and changing the rotational speed of a liquid delivery pump (not shown) connected to the liquid supply apparatus 12 respectively or by changing the combination of the two manners. Therefore, it is guaranteed that the liquid does not generate cavitation damage in the liquid distribution chamber 13, so that the device is prevented from being damaged, cavities do not appear when the liquid enters the mixing chamber 11 to be in contact with solids, and the situation that the solids enter the liquid cavities to form caking to cause equipment blockage is avoided to a great extent. Of course, it is also possible to control the flow direction of the liquid by adjusting the angles of the inlet nozzles.

The mixing chamber 11 is used for wetting and mixing the incoming solids with the liquid to form the suspension. In the present disclosure, in order to isolate the solid conveying chamber 10 and the mixing chamber 11 of the mixing device from the outside air, isolation from the outside air of the device can be achieved by providing a valve in the solid supply apparatus 9. The solids are continuously and uniformly input into the mixing chamber 11 through the screw feeding apparatus 22, and the liquid is sufficiently, continuously and uniformly input into the mixing chamber 11 by the liquid distribution chamber 13 at a predetermined flow rate. Due to the sealing of the screw feeding apparatus 22 and an input port thereof, when the mixing chamber 11 rotates to accelerate the liquid to pass through the mixing chamber 11 and be discharged, the mixing chamber 11 generates a suction effect, so that the air in the front of the solid conveying chamber 10 and the mixing chamber 11 quickly enters the rear part of the mixing chamber 11 and is discharged, and the conveying chamber 10 and the front part of the mixing chamber 11 enter a negative pressure state; the air on the surfaces of the solids in the solid conveying chamber 10 is separated from the surfaces of the solids in a vacuum environment, and the solids partially remove the air on the surface before making contact with the liquid, so that the liquid is easier to wet the solids.

The mixing chamber 11 comprises an annular gap 23 defined by the truncated conical impeller body 2 and a portion of the annular wall of the housing 14 corresponding to the truncated conical impeller body 2. The diameter of the cross section of the truncated conical body 2 is integrally and gradually increased in the direction from the inlet of the mixing chamber 11 to the outlet of the mixing chamber 11, the linear speed of the upper portion with the small diameter of the cross section in the circumferential direction is smaller than that of the lower portion with the large diameter of the cross section under driving of the main shaft, the truncated conical body 2 is driven by the main shaft 21, and the suspension on the surface of the truncated conical body 2 achieves accelerated movement from top to bottom. In the accelerated movement process, on one hand, the suction effect of the outlet area of the mixing chamber 11 is generated, so that air on the surfaces of the solids in the suspension further leaves the solids, and the solids and the liquid are more uniformly mixed.

The solid conveying chamber 10 at the output end of the screw feeding apparatus 22 of the mixing device further comprises a scattering apparatus 24, such as a scattering cone, a screen, a powder scattering disc, a screw, or a scattering pin. The screw feeding apparatus 22 enables the solids to pass through the scattering apparatus 24, scattering of the solids is achieved, air on the surfaces of the solids in the solid conveying chamber 10 can be separated from the solids, and therefore uniform mixing of the solids and liquid in the mixing chamber is facilitated.

The dispersion chamber 15, defined by a portion of the impeller assembly other than the body 2 and a corresponding portion of the housing 14, is provided between the lower flow channel outlet of the mixing chamber 11 and the discharging apparatus 26. According to the working process and the working principle of the present disclosure, the solid conveying chamber 10, the liquid distribution chamber 13, the mixing chamber 11 and the dispersion chamber 15 are not independent chambers but communicate with one another, and only due to the technological requirements, the liquid and the solids enter the different chambers in sequence from entering the mixing device to complete corresponding treatment, so that corresponding treatment effect is obtained. The dispersion chamber 15, the mixing chamber 11 and the discharging apparatus 26 are connected together, and the structural boundaries of the dispersion chamber 15, the mixing chamber 11 and the discharging apparatus 26 are not obvious, but the functions of the dispersion chamber 15, the mixing chamber 11 and the discharging apparatus 26 are completely different. At the outlet of the mixing chamber 11, the solids have been wetted and mixed to some extent with the liquid, so that the suspension with powder particles is formed. However, since the lower edge of the impeller 1 rotates at a much greater speed than the upper part, the movement speed of the suspension discharged from the mixing chamber 11 is very fast. It is verified that more than two blocking plates 5 are arranged at the downstream position, the high-speed movement suspension flowing out of the mixing chamber 11 is dispersed through the rotary shearing effect between the blocking plates 5, and the effect of using an independent high-speed dispersion machine in the prior art can be completely achieved. Further, the blocking plates 5 of the present disclosure may be fixed to the housing 14 of the mixing device or the base plate 3 of the impeller assembly respectively. Due to the fact that one blocking plate 5 does not rotate, and the other blocking plate 5 rotates along with the impeller, strong shearing force is formed, and the dispersion effect of the suspension is quite ideal. Of course, the blocking plates 5 are fixed in a wide variety of ways and are not limited to those described above, so long as the fixation of at least one blocking plate 5 and the rotation of at least one blocking plate 5 can be ensured, the normal operation of the system can be maintained.

The mixing device and the impeller assembly have the following beneficial effects: firstly, the functions which are usually required to be completed on two devices are integrated on one device, so that the production process is simplified, and the cost is greatly saved; secondly, multiple blocking plates are additionally arranged on a channel where the suspension is thrown out forcefully, gaps between the blocking plates, holes in the blocking plates, gaps between the blocking plates and the housing, a base plate at the bottom of the impeller and a top plate of the discharging blades jointly form a flow channel of the suspension, it is guaranteed that all slurry passes through a bent channel mainly formed by the blocking plates and the inner wall of the housing, and therefore the slurry dispersion time is prolonged, the slurry movement complexity is increased, and the dispersion effect on high-viscosity liquid generated by mixing ultrafine powder and a small amount of liquid is obviously improved; thirdly, a mixed mode of a fixed blocking plate and a movable blocking plate is creatively designed, the relative rotational movement between the blocking plates is fully utilized, high-speed shearing, friction and rubbing of the suspension are realized in a narrow channel, and the powder dispersion effect is better than that of a single-layer perforated blocking plate; fourthly, the discharging blades are additionally arranged at the blocking plate on the outermost side, and negative pressure is formed in a relatively closed space, so that the suspension can be rapidly discharged through an outlet after being dispersed, the flow velocity reduction caused by the blocking plates is counteracted, and the raw material treatment speed is increased; and fifthly, the structure and technological characteristics of existing mixing device are fully utilized, on the basis of the existing mixing device, the existing structure does not need to be greatly changed, all components of the existing mixing device are reasonably utilized, no new electric energy consumption component is added, the energy consumption for treating unit quantity of raw materials is greatly reduced, and function increase and performance improvement can be realized only by adding multiple blocking plates in corresponding shapes, so that the cost is greatly saved.

It is worth noting that in the above embodiments, the various modules included are only divided according to functional logic, but are not limited to the above division as long as the corresponding functions can be realized; and in addition, the specific names of the functional units are also only for convenience of distinguishing each other and are not intended to limit the scope of protection of the present disclosure.

The foregoing descriptions are merely exemplary embodiments of the present disclosure, but are not intended to limit the present disclosure. Any modification, equivalent replacement, or improvement made within the spirit and principle of the present invention shall fall within the protection scope of the present disclosure.

What is claimed is:

1. A solid-liquid mixing device using an impeller assembly, comprising a housing and an impeller, the impeller comprising a truncated conical body, and multiple mixing blades being formed from top to bottom on an inclined surface of the body, wherein the impeller assembly further comprises at least two blocking plates provided on an outer side of a lower portion of the body, wherein one of the at least two blocking plates is fixed on the impeller of the impeller assembly, and another one of the at least two blocking plates is fixed on the housing of the solid-liquid mixing device;

wherein gaps between the at least two blocking plates, gaps between the one of the at least two blocking plates on the impeller and the housing, and gaps between the another one of the at least two blocking plates on the housing and the impeller jointly form flow channels of a suspension.

2. The solid-liquid mixing device according to claim 1, wherein holes are formed in at least one of the at least two blocking plates.

3. The solid-liquid mixing device according to claim 2, wherein gaps between the at least two blocking plates, the holes, gaps between the at least two blocking plates and the housing jointly form flow channels of a suspension.

4. The solid-liquid mixing device according to claim 1, wherein gaps between upper or lower end faces of the at least two blocking plates and the housing are 2-5 mm, and the gap between every two adjacent blocking plates is 1-5 mm.

5. The solid-liquid mixing device according to claim 3, wherein the holes between every two adjacent blocking plates are mutually staggered in an axial direction.

6. The solid-liquid mixing device according to claim 1, further comprising multiple discharging blades roughly provided on an outer side of the outermost blocking plate in a radial direction, and the discharging blades being fixedly connected with the impeller and synchronously rotating along with the impeller.

7. The solid-liquid mixing device according to claim 1, wherein each of the at least two blocking plates is slotted or knurled.

8. The solid-liquid mixing device according to claim 1, further comprising:
- at least one solid supply apparatus, conveying a solid to a mixing chamber through a solid conveying chamber;
- at least one liquid supply apparatus, conveying a liquid to the mixing chamber through a liquid distribution chamber;
- a mixing chamber, defined by corresponding portions of the body and the housing, wherein rotation of the impeller mixes the solid and the liquid so as to form a suspension; and
- a dispersion chamber provided between a flow channel outlet at a lower portion of the mixing chamber and a discharging apparatus, and defined by a portion of the impeller assembly other than the body and a corresponding portion of the housing, wherein a shearing effect of the at least two blocking plates disperses the suspension flowing out of the mixing chamber.

* * * * *